(12) United States Patent
Amatucci

(10) Patent No.: US 6,482,548 B2
(45) Date of Patent: Nov. 19, 2002

(54) LITHIUM-ALUMINUM DUAL-CATION RECHARGEABLE ELECTROCHEMICAL BATTERY CELL

(75) Inventor: Glenn G. Amatucci, Raritan, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 193 days.

(21) Appl. No.: 09/739,566

(22) Filed: Dec. 18, 2000

(65) Prior Publication Data

US 2002/0076618 A1 Jun. 20, 2002

(51) Int. Cl.[7] .............................. H01M 6/18; H01M 4/58
(52) U.S. Cl. ................ 429/319; 429/231.95; 429/231.1; 429/188; 429/320; 429/321; 429/322
(58) Field of Search ...................... 429/231.95, 231.1, 429/231.5, 188, 319, 320, 321, 322

(56) References Cited

U.S. PATENT DOCUMENTS 6,017,651 A * 1/2000 Nimon et al. ............... 429/101
6,248,477 B1 * 6/2001 Howard, Jr. et al. ........ 429/224

FOREIGN PATENT DOCUMENTS

JP           63-257183       * 10/1988       ............ H01M/6/16

* cited by examiner

*Primary Examiner*—Patrick Ryan
*Assistant Examiner*—Angela J Martin
(74) *Attorney, Agent, or Firm*—David A. Hey

(57) ABSTRACT

A rechargeable battery cell (10) having high operating voltage and significantly increased specific capacity comprises a positive electrode member (13), a negative electrode member (17), and an interposed separator member (15) containing an electrolyte comprising a solution of a polyvalent aluminum cation solute in a non-aqueous solvent. The positive electrode member comprises an active material which reversibly takes up and releases the reactive polyvalent cation species during operation of the cell while the active material of the negative electrode contemporaneously reversibly releases into and takes up from the electrolyte solvent a monovalent cation species. Preferred cation species are those of aluminum, such as $Al^{3+}$, and alkali metals, such as $Li^+$.

10 Claims, 4 Drawing Sheets

LITHIUM-ALUMINUM DUAL-CATION RECHARGEABLE ELECTROCHEMICAL BATTERY CELL

BACKGROUND OF THE INVENTION

The present invention relates to a high voltage, high capacity rechargeable electrochemical battery cell which comprises a positive electrode, a negative electrode, and an interposed separator with an electrolyte comprising, during operation of the cell, a pair of different mobile cation species which individually participate in redox activity at the respective electrodes. More particularly, the invention relates to the preparation and use of a rechargeable battery cell comprising an electrode material which participates predominantly, during cycling of the cell, in a redox reaction with the first of a pair of cation species, of which one is polyvalent, present in the cell electrolyte while the second of the cation species reacts predominantly at the opposite electrode of the cell. These contemporary redox reactions enable multiple electron per ion transfer during cell operation with a resulting significant increase in cell capacity without loss of high voltage output.

The present market for compact, light-weight rechargeable batteries is served in great measure by lithium intercalation batteries, particularly Li-ion cells, which, by virtue of the light weight of the lithium electrode and electrolyte component materials, provide a significant level of specific capacity, i.e., the amount of energy per unit of cell weight that can be stored and transferred from a cell. The high reactivity of lithium yields an additional benefit in providing an exceptionally low electrical potential in an incorporating negative cell electrode, which may comprise lithium metal or alloy, or a lithium-intercalating material. As a further advantage, a wide variety of metal oxide, sulfide, or fluoride materials are available which react with lithium at high electrical potential, thereby enabling their use as positive electrode components in resulting high-voltage battery cells.

The advantageous composite effect of the light weight and high voltage operation of Li-ion cells on the resultant specific energy density of these rechargeable batteries is marred, however, by the limitation that the mobile lithium cation upon which cell operation depends is monovalent and therefore capable of accounting for the operative transfer of only a single electron per available $Li^+$ ion.

Considering the dependence of cell capacity upon the valence of the charge transfer ion, an alternative means of increasing the capacity of an electrochemical cell would logically appear to involve the use of polyvalent reactive components. Such an approach has been considered, as in U.S. Pat. No. 5,601,949; however, the substitution of polyvalent cations for the monovalent lithium in an attempt to achieve higher capacity intercalation battery cells has met with little actual success. The failure of such cells appears to be attributable to a number of causes, not the least of which is the significantly greater size of the polyvalent ion which prevents effective intercalation into negative electrode compositions, such as the graphite or other carbonaceous materials proposed in that patent specification.

An additional deterrent to the effective operation of a polyvalent ion cell is the passivation layer of reaction materials, referred to as a solid/electrolyte interface (SEI), typically of reduction byproducts, e.g., electrolyte cation oxides, fluorides, carbonates, and the like, which form at the surface of the negative cell electrode during the first cycle charging period. While $Li^+$ ions of a common Li-ion intercalation cell are able to diffuse through the SEI layer in order to contact and be reduced at the negative electrode, polyvalent cations cannot diffuse in this manner and are significantly deterred from participating in the essential redox reaction at the negative electrode. Although some reduction of the polyvalent cation may transpire, the reaction occurs at the invariably higher potential of the passivation layer reaction products, thus decreasing the potential difference between the electrodes with a resulting decrease in the operating cell voltage.

The practical utilization of polyvalent electrochemical cell components in order to increase cell capacity has been found to require the implementation of a mechanism other than the simple transmission of a species of mobile polyvalent cation between cell electrodes. Co-pending U.S. patent application 09/577,643, filed May 24, 2000, the disclosure of which is incorporated herein by reference, describes such a novel and effective mechanism which enables the capacity improving use of such polyvalent cell components. In addition to a negative electrode member comprising a material source of highly reactive, negative-acting cation species, typically of an alkali metal, e.g., $Li^+$, the described cell comprises a non-aqueous solution of a solute providing polyvalent yttrium, lanthanum, or alkaline earth metal cation species, along with a positive electrode member comprising a transition metal compound capable of reversibly taking up and releasing such polyvalent ions in reactions complementary to the reversible release and intercalation of the alkali metal ions between the negative electrode and the electrolyte.

In the course of further investigations into such dual cation electrolytic cells, it was discovered in the present invention that a remarkable and extraordinary improvement in the performance and practical economy of such cells can be effected through the use of electrolyte compounds of polyvalent aluminum cation species entirely unrelated to the alkaline earth metal compounds contemplated in the earlier work.

SUMMARY OF THE INVENTION

A rechargeable electrochemical cell prepared according to the present invention comprises a positive electrode member, a negative electrode member, and an interposed separator member which is ion-transmissive and electron-insulative. Also interposed and contained between the electrode members is an electrolyte comprising a non-aqueous solution of a solute providing polyvalent aluminum cations, viz., $Al^{3+}$. Electrolyte solute compounds suitable for this purpose have been found to be those which, unlike aluminum halide and hydride salts commonly utilized in aluminum electrolysis operations, do not readily support the electrolytic plating of aluminum. Particularly useful are such solutes as aluminum triflate, perchlorate, tetrafluoroborate, and hexafluorophosphate salts The positive electrode member comprises an active material, such as a transition metal oxide, sulfide, fluoride, or carbon fluoride, which can take up and release the polyvalent aluminum cations in a reversible reduction reaction of intercalation, alloying, adsorption, or the like during operation of the cell. The negative electrode member comprises an active material which provides a source of a second, highly reactive, negative-acting cation species, preferably of an alkali metal, such as $Li^+$, $Na^+$, $K^+$, $Rb^+$, or $Cs^+$, capable of being reversibly released into and taken up from the electrolyte solvent during operation of the cell. Such a negative electrode active material may be the alkali metal, an alloy of the alkali metal, or a carbonaceous material, e.g., coke, hard carbon, or graphite, capable of intercalating the alkali metal cation.

One embodiment of a cell of the present invention comprises a positive electrode member of $V_2O_5$, a negative electrode member of $Li_xSi$, and an electrolyte of 0.5 M $Al(ClO_4)_3$ in a 2:1 mixture of ethylene carbonate (EC) and dimethyl carbonate (DMC) saturating a borosilicate glass fiber separator membrane. During the initial discharge of the cell, $Al^{3+}$ ions from the electrolyte move to the reversible reaction at the positive electrode while $Li^+$ ions from the negative electrode are released into the EC:DMC solvent of the electrolyte. Due primarily to the physical proximity to the positive electrode of the relatively high concentration of $Al^+$ ions and the higher overall potential of intercalation, these reactions predominate at their respective electrodes.

Upon recharging of the cell, the reactions tend toward reversal in the usual manner, i.e., with deintercalation or other release of the $Al^{3+}$ ions from the positive electrode and movement of both cation species toward reduction at the negative electrode. However, due to the rapid formation of passivation products at the surface of the negative electrode, only the $Li^+$ ions are able to diffuse through the SEI layer in order to reach the LiSi negative electrode material where they are reduced at a potential of about that of the theoretical–3.0 V vs SHE. Despite ever greater applied recharge voltage, the passivation layer at the negative electrode, as well as the electrolyte composition, prevents the reduction of the $Al^{3+}$ ions, which remain in electrolyte solution, thus maintaining the low relative potential of the negative electrode and the resulting high operating voltage of the cell.

The procedures for fabricating laminated polymeric electrolytic cell electrode members which have been widely used in practice, such as described in U.S. Pat. No. 5,460,904, serve well in the preparation of electrode members of cells of the present invention. In this manner, positive electrode members may be readily prepared by dispersing about 35 to 60 parts of an active material capable of intercalating polyvalent cations, e.g., any of various vanadium and molybdenum oxides and sulfides, preferably in nano-material form, with 5 to 10 parts conductive carbon in a matrix composition comprising an organic solution, e.g. in 25 to 35 parts acetone, of about 15 to 25 parts binder polymer, such as a poly(vinylidene fluoride-co-hexafluoropropylene), and 20 to 30 parts of a primary plasticizer for the polymer, e.g., dibutyl phthalate.

The composition is cast as a layer which is air dried to a membrane at room temperature prior to being cut to desired size for cell fabrication. The membrane specimen may then be laminated to an electrically conductive current collector member and thereafter to counter-electrode and separator members. The laminated assemblage is usually then extracted of incorporated plasticizer with a polymer-inert solvent, such as diethyl ether, prior to the addition of electrolyte solution. Although commercial cells will preferably be fabricated as fully laminated electrode-separator assemblies, experimental laboratory models are more readily assembled for testing in Swagelok test cells which in essence closely resemble the physical pressure style battery, cell such as is typified by the familiar "button" battery. This latter style battery structure may be used as well to embody the present invention.

BRIEF DESCRIPTION OF THE DRAWING

The present invention will be described with reference to the accompanying drawing of which.

DESCRIPTION OF THE INVENTION

Figure 1:
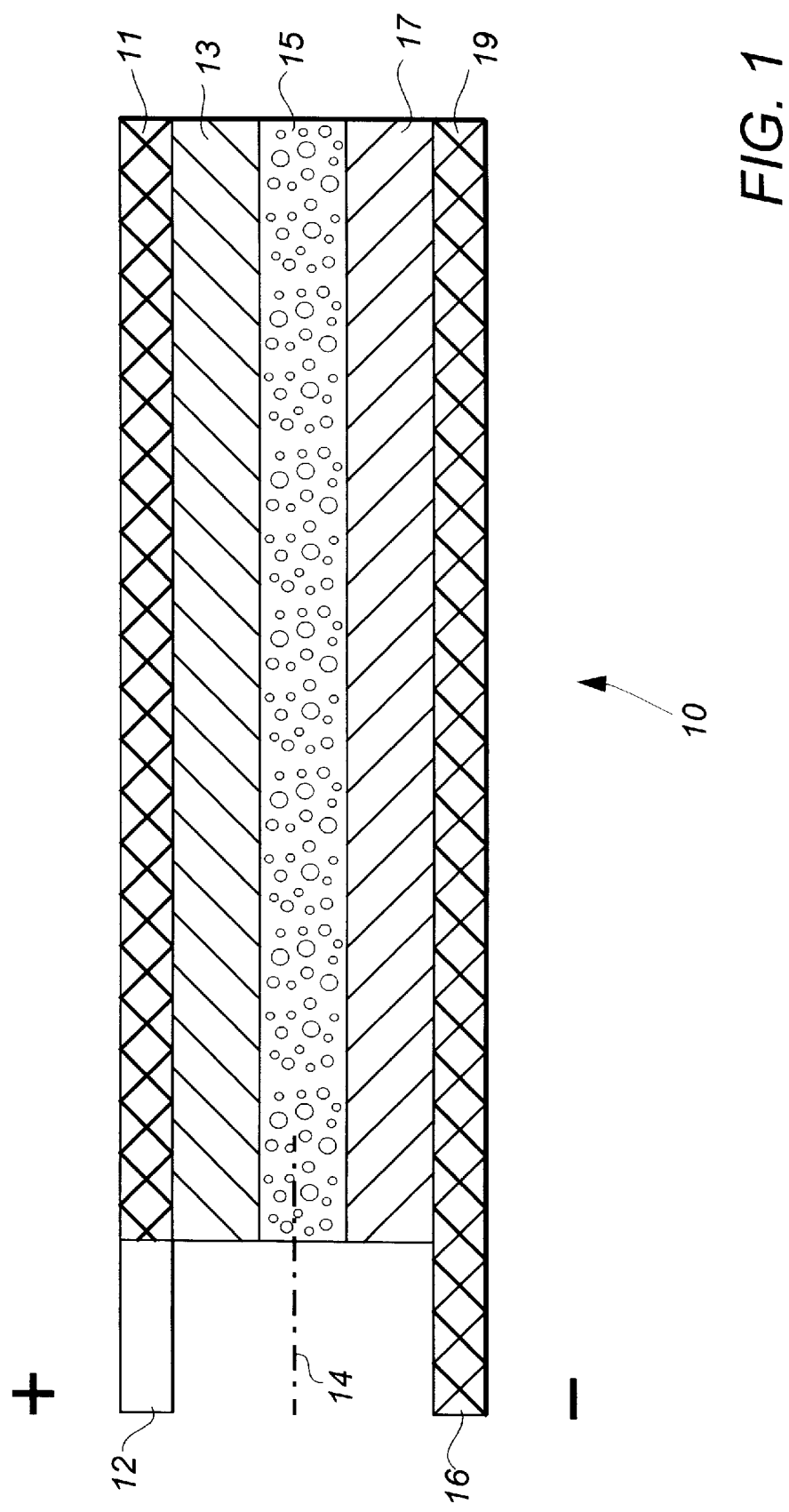
FIG. 1 is a diagrammatic representation in cross section of a laminated battery cell embodying the present invention.

As seen in FIG. 1, a battery cell structure 10 useful in the present invention comprises, preferably in the form of a laminated assembly of members such as described in the above-mentioned U.S. Pat. No. 5,460,904, a positive electrode member 13, a negative electrode member 17, and an interposed separator member 15 containing cell electrolyte. Current collector members 11, 19 associated with the respective positive and negative electrode members provide electrical circuit connections for the cell, such as at extending terminal tabs 12, 16. For laboratory test purposes, it is useful to provide an intermediate electrode, such as a silver wire 14, within separator member 15 in order to establish a quasi-reference electrical potential for the respective positive and negative half-cells.

Typically, positive electrode 13 comprises a vinylidene copolymer matrix membrane containing a dispersion of, preferably, nano-sized active material, such as a transition metal oxide or sulfide, e.g., $V_2O_5$, or $MoS_x$, capable of intercalating or adsorbing polyvalent electrolyte cations, in the present instance, $Al^{3+}$. Negative counter-electrode 17 comprises a similar copolymer matrix dispersion of an active material compound, or simply a metal foil, capable of reversibly plating, alloying, intercalating, or otherwise reacting with, and thus providing a source of, monovalent cations, such as of Li, Na, or other alkali. Separator 15 may likewise be a polymeric membrane, as described in the referenced specification, or it may comprise a widely used microporous membrane or simply a glass fiber mat, any of which is capable of absorbing the non-aqueous electrolyte, e.g., about a 0.5 to 2 M solution of a polyvalent aluminum cation compound in a solvent mixture of cyclic and acyclic carbonates. Such an electrolyte may additionally comprise a small amount of a monovalent alkali salt which can benefit the reaction kinetics of the negative electrode and enable fabrication of the cell in the discharged state, as well.

The datum reference established by optional Ag electrode 14 provides a convenient means for determining individually the electrolytic activity of selected composition constituents at the respective electrodes. In this manner, effective electrode and electrolyte combinations may be identified. For example, implementation of such a reference electrode has been instrumental in confirming the electrolytic cell mechanism wherein a polyvalent cation species, e.g., $Al^{3+}$, is denied access to a passivated alkali metal negative electrode or is otherwise prevented from plating or reducing at that electrode in order to effect cell charging, despite applied voltages greatly in excess of that theoretically required.

In fabricating working battery cells, selected cell compositions and components were conveniently assembled in standard Swagelok test cell apparatus in which positive and negative electrode members with intervening electrolyte-saturated separator member are compressed between opposing current collector block members to achieve the essential intermember contiguity. After assembly, each test cell was arranged in circuit with a MacPile or other automatic cycling control/data-recording system operating in the galvanostatic mode at a preselected cycling rate of about 7 mA per g of active material to obtain a characteristic signature voltage/capacity profile of the test cell.

In the light of the foregoing discussion, the following examples will provide the skilled artisan with further guidance toward selection of useful combinations of components and compositions for effective practice of the present invention.

EXAMPLE I

A lithium intercalation test cell was fabricated as a comparative example of the operating voltage level and capacity achieved in a single monovalent cation battery cell typical of the prior art. A positive electrode was cast as a layer of a composition comprising 28 parts by weight of nano-sized (about 20–60 nm) $V_2O_5$, 6 parts of conductive carbon black (MMM super P), 15 parts of poly(vinylidene fluoride-co-hexafluoropropylene) (Elf Atochem, Kynar 2801), and 23 parts of dibutyl phthalate plasticizer in 28 parts of acetone. The layer was dried at 22° C. for about 0.5 hr to form a self-supporting membrane, and disks of 1 $cm^2$ were cut from the membrane to provide electrode members comprising about 5 to 20 mg of active material, i.e., $V_2O_5$. In order to prepare the cell for introduction of electrolyte in the manner of prior art laminated cell structures, the plasticizer was extracted from the electrode disk member with diethyl ether.

A negative electrode member was likewise prepared from a cast layer of a composition similar to that of the positive electrode, but for the substitution of Si for the $V_2O_5$. A segment of the dried, extracted layer was overlaid upon a segment of lithium foil and an electrode member disk was cut from the composite material. An $Li_xSi$ alloy having a surface area of greater than about 0.5 $m^2/g$ spontaneously formed in situ at the negative electrode disk member over a short period of time.

Figure 2:
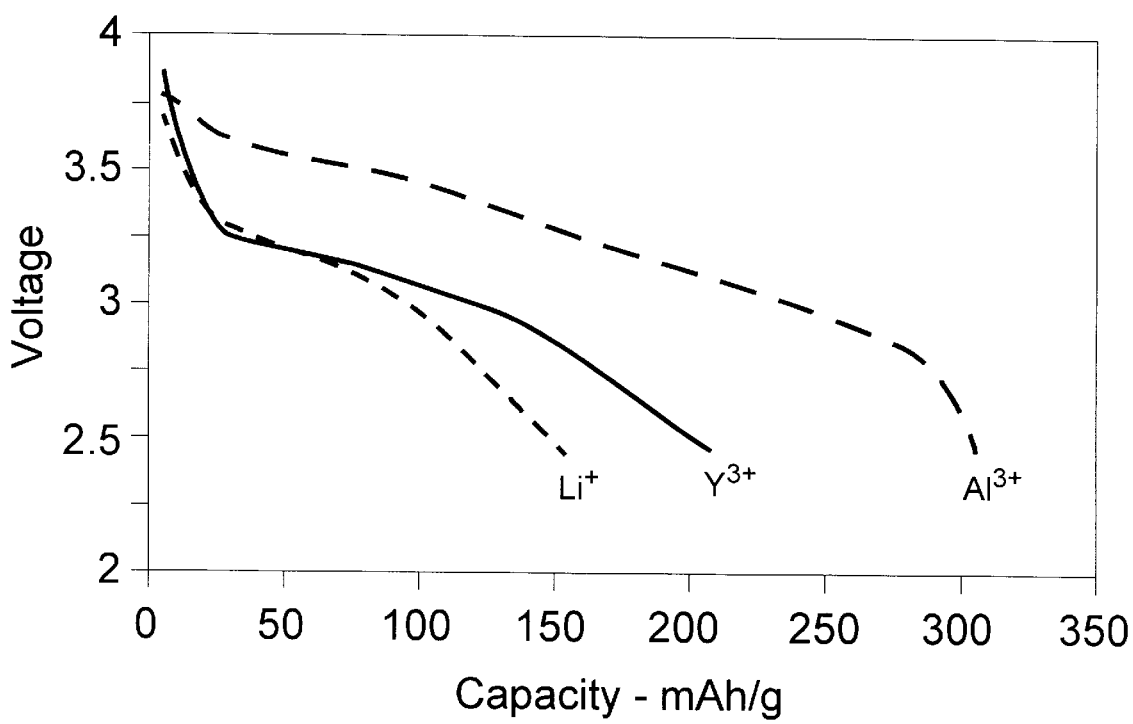
FIG. 2 is a graph tracing characteristic first discharge voltage and specific capacity in cells representative of prior art single cation ($Li^+$) and earlier $Y^{3+}$ dual cation cells, and an $Al^{3+}$ dual cation cell of the present invention.

The electrode members were assembled under substantially anhydrous conditions (−80° C. dewpoint) in a Swagelok test cell with an intervening disk of borosilicate glass fiber mat saturated with a 1 M electrolyte solution of $LiPF_6$ in a 2:1 mixture of ethylene carbonate (EC) and dimethyl carbonate (DMC). The cell was then cycled in circuit with the automated test controller/recorder for a number of periods during which the $Li^+$ electrolyte cation reactions of intercalation at the positive electrode during discharge and reduction at the negative electrode during recharge were repeated in the usual manner. The recorded data, comprising the two-electrode output voltage of the cell and indicating a first-discharge specific capacity of about 150 mAh/g, were plotted to yield the characteristic $Li^+$ trace depicted in FIG. 2.

EXAMPLE II

A second comparative example of a dual cation battery cell comprising an alkaline earth metal polyvalent cation was prepared in the manner of Example I utilizing the $V_2O_5$ positive and $Li_xSi$ negative electrode members of Example I. The electrolyte, however, was a 0.5 M solution of $Y(ClO_4)_3$ in the 2:1 mixture of EC:DMC providing a source of polyvalent $Y^{3+}$ cations. The cell was cycled in the manner of Example I and the recorded data, indicating the general dual cation improvement in first-discharge specific capacity to about 200 mAh/g, were plotted to yield the characteristic $Y^{3+}$ trace depicted in FIG. 2

EXAMPLE III

A battery cell embodying the present invention, i.e., comprising dual cations including at least one which is polyvalent $Al^{3+}$, was prepared generally in the manner of Example II, comprising in the respective positive and negative electrodes materials capable of intercalating or adsorbing the polyvalent aluminum cation during the discharge cycle segment and of reducing, plating, or alloying with the smaller and more reactive second cation, typically of a monovalent alkali, during the charging cycle segment. In combination with such electrode materials, the electrolyte provides the polyvalent aluminum cation and is capable of readily receiving into the electrolyte solution the second cation species.

Specifically, the positive electrode member of this dual cation cell comprised the $V_2O_5$ nano-material of Example I and the negative electrode member comprised the $Li_xSi$ of that example. Thus, although the active electrode materials of the cell may serve equally as well in the cell structure of the present invention as in those of the prior art, a surprisingly effective distinction is made in the electrolyte cation employed. According to this invention, the cation of the electrolyte is selected to be the polyvalent aluminum cation of the dual cation combination while the complementary cation is typically the monovalent cation component of the negative electrode composition. In the present example, the electrolyte is a 0.5 M solution of $Al(ClO_4)_3$. A trace of the first-discharge cycling voltage of the cell is depicted at $Al^{3+}$ in FIG. 2 and shows the remarkable increase in specific capacity reaching to about 300 mAh/g.

EXAMPLE IV

Figure 3:
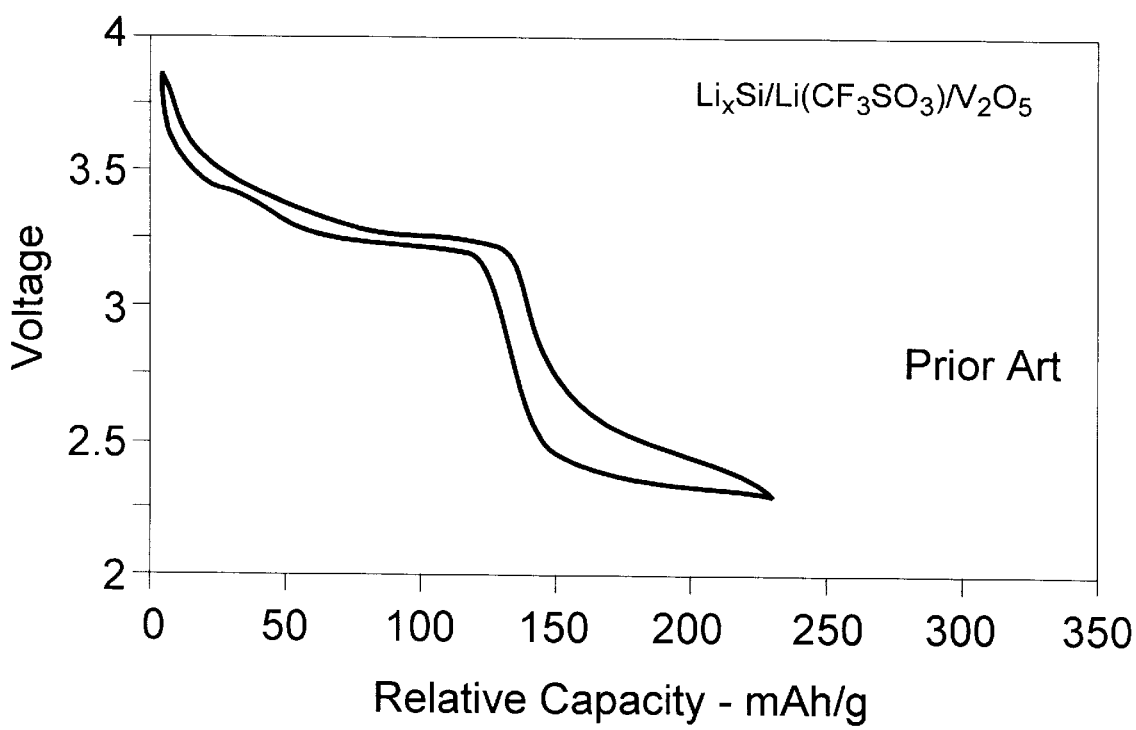
FIG. 3 is a graph tracing characteristic recycling voltage and relative capacity of a prior art single cation ($Li^+$) cell.
Figure 4:
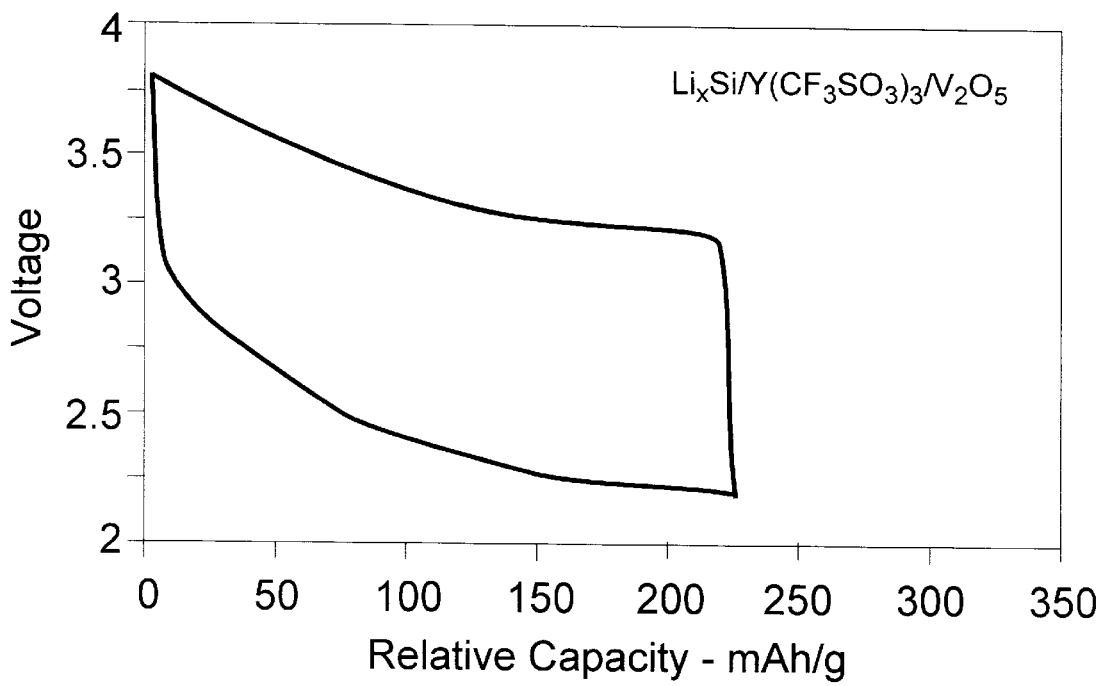
FIG. 4 is a graph tracing characteristic recycling voltage and relative capacity in an earlier embodiment of a dual cation ($Y^{3+}$) cell.
Figure 5:
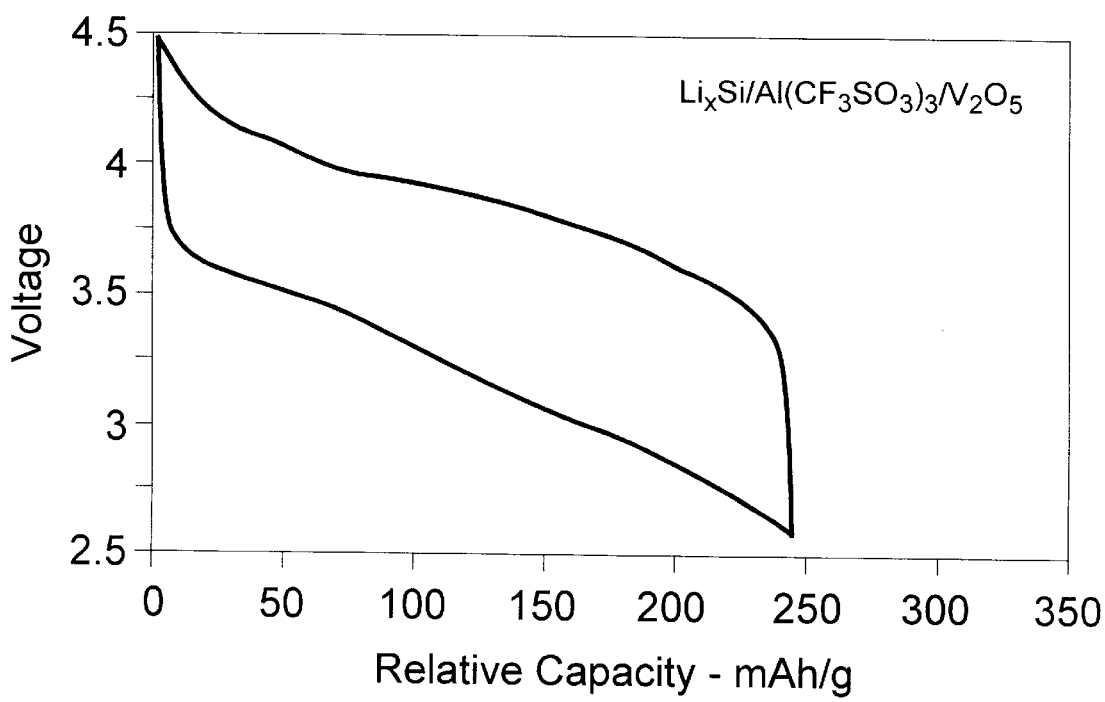
FIG. 5 is a graph tracing characteristic recycling voltage and relative capacity in an embodiment of a dual cation ($Al^{3+}$) cell of the present invention.

Another set of comparative test cells were prepared in the manner if the foregoing examples, utilizing respective triflate electrolyte compositions and a larger (60–90 nm) nano-sized $V_2O_5$ as the positive electrode active material. The resulting cells were tested through extensive charge-discharge cycles and the data obtained were plotted to provide the characteristic traces of voltage and specific capacity depicted respectively for the single cation $Li^+$ and dual cation $Y^{3+}$ and $Al^{3+}$ cells in FIGS. 3–5. The $Al^{3+}$ dual cation cell of the present invention exhibited not only an improvement in specific capacity, but also indicated a higher operating voltage range, thus providing an extraordinary increase in specific energy density.

EXAMPLE V

Figure 6:
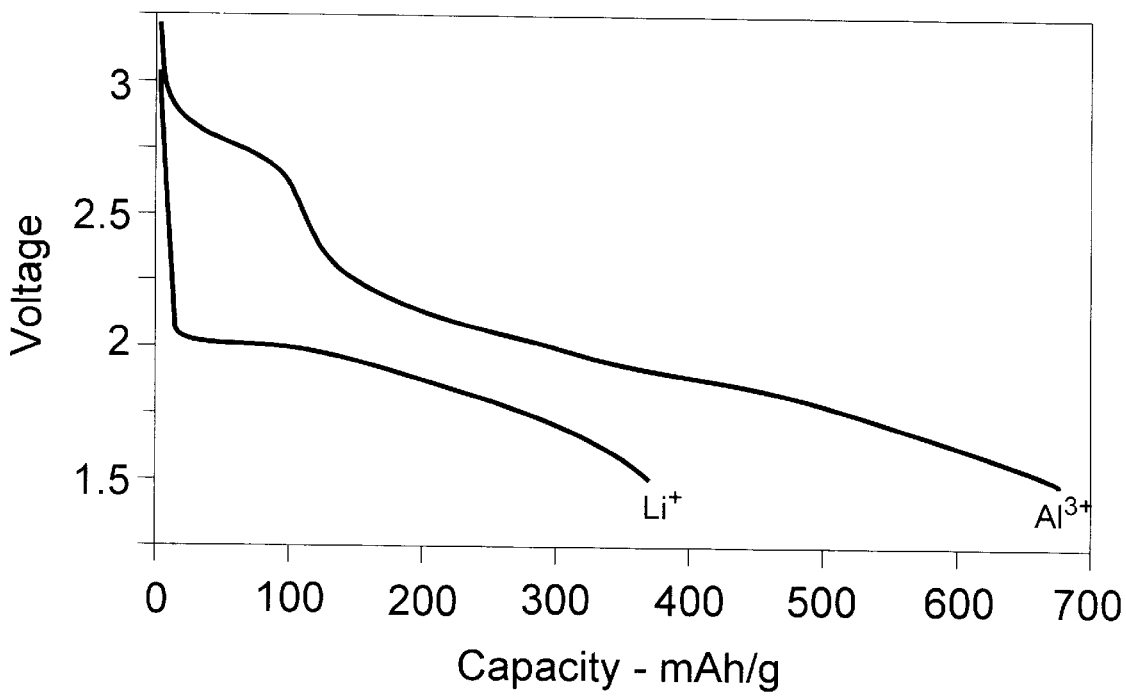
FIG. 6 is a graph tracing characteristic first discharge voltage and specific capacity in comparative embodiments of a prior art single cation ($Li^+$) cell and an $Al^{3+}$ dual cation cell of the present invention.
Figure 7:
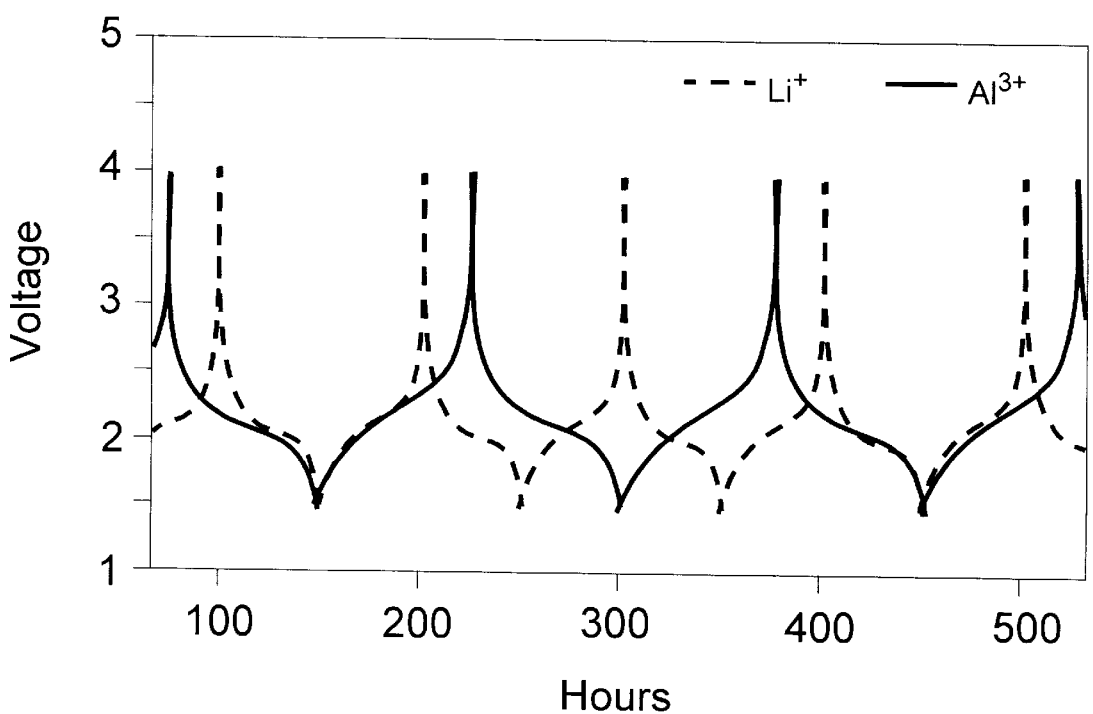
FIG. 7 is a graph tracing characteristic recycling voltage of the cell embodiments of FIG. 6 during long-term cycling tests.

Yet another cell embodiment of the present invention was prepared, along with a comparative single-cation $Li^+$ cell, comprising negative and separator members of the foregoing examples with a positive electrode member comprising a $MoS_x$ active material prepared by thermal decomposition of ammonium tetrathiomolybdate. The cells were activated respectively with 1.0 M Li(CF$_3$SO$_3$) and 0.5 M Al(CF$_3$SO$_3$)$_3$ electrolyte solutions in EC:DMC and tested through extended charge-discharge cycles at a rate of 7 ma/g. The plots of data obtained in these tests depict initial discharge capacity in FIG. 6 and long-term cycling characteristics of the cells in FIG. 7. The extraordinary increase in initial discharge capacity exhibited, at Al$^{3+}$, by the cell of the present invention over that, at Li$^+$, of the prior art cell is clearly evident in FIG. 6. The remarkable aspect of the performance of the present dual cation cell is seen in FIG. 7 where the Al$^{3+}$ cell maintains after extensive cycling a 50% greater specific capacity calculated to be about 525 mAh/g.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A rechargeable battery cell comprising a positive electrode member, a negative electrode member, and a separator member disposed therebetween and containing an electrolyte characterized in that
    a) said electrolyte comprises a solution in a non-aqueous solvent of a solute providing a polyvalent aluminum cation species;
    b) said positive electrode member comprises an active material capable of reversibly taking up and releasing said polyvalent cation species during operation of said cell; and
    c) said negative electrode member comprises an active material capable of reversibly releasing into and taking up from said solvent a second cation species during operation of said cell.

2. A battery cell according to claim 1 characterized in that said second cation species is selected from the group consisting of alkali metals.

3. A battery cell according to claim 2 wherein said positive electrode active material is selected from the group consisting of transition metal oxides, sulfides, fluorides, and carbon fluorides.

4. A battery cell according to claim 3 wherein said positive electrode active material is selected from the group consisting of oxides and sulfides of vanadium and molybdenum.

5. A battery cell according to claim 4 wherein said positive electrode active material is selected from the group consisting of V$_2$O$_5$ and MoS$_x$.

6. A battery cell according to claim 2 wherein said negative electrode active material is selected from the group consisting of alkali metals, alkali metal alloys, and carbonaceous materials capable of intercalating alkali metal cations.

7. A battery cell according to claim 6 wherein said negative electrode active material is selected from the group consisting of lithium, sodium, lithium alloys, and sodium alloys.

8. A battery cell according to claim 2 wherein said polyvalent cation species is Al$^{3+}$, and said second cation species is selected from the group consisting of Li$^+$, Na$^+$, K$^+$, Rb$^+$, and Cs$^+$.

9. A battery cell capable of reversible operation by charging and discharging and comprising a positive electrode member, a negative electrode member, and a separator member disposed therebetween and containing an electrolyte characterized in that during operation of said cell,
    a) said electrolyte comprises a non-aqueous solvent containing varying concentrations of at least two reactive cation species;
    b) a first of said cation species is Al$^{3+}$ reacting predominantly at said positive electrode member; and
    c) the other of said cation species is a monovalent cation selected from the group consisting of alkali metal cations reacting predominantly at said negative electrode member.

10. A battery cell according to claim 9 wherein said other of said cation species is selected from the group consisting of Li$^+$, Na$^+$, K$^+$, Rb$^+$, and Cs$^+$.

* * * * *